(12) United States Patent
Cheng et al.

(10) Patent No.: US 7,766,434 B2
(45) Date of Patent: Aug. 3, 2010

(54) DUALLY FOLDABLE HOST UNIT CASE FOR A COMPUTER

(75) Inventors: Sheng-Hsiung Cheng, Taipei Hsien (TW); Te-An Lin, Taipei Hsien (TW); Wu-Nan Wang, Taipei Hsien (TW); Chia-Chia Huang, Taipei Hsien (TW)

(73) Assignee: Aopen Inc., Hsichih, Taipei Hsien (TW)

( * ) Notice: Subject to any disclaimer, the term of this patent is extended or adjusted under 35 U.S.C. 154(b) by 679 days.

(21) Appl. No.: 11/592,239

(22) Filed: Nov. 3, 2006

(65) Prior Publication Data

US 2007/0228900 A1    Oct. 4, 2007

(30) Foreign Application Priority Data

Apr. 3, 2006    (TW) ............................... 95111830 A (51) Int. Cl.
*A47B 43/00* (2006.01)
*H05K 5/02* (2006.01)

(52) U.S. Cl. .................... 312/223.2; 220/6; 361/679.02

(58) Field of Classification Search .............. 312/223.1, 312/223.2, 257.1, 258, 262; 361/679.02, 361/679.6; 174/50, 58, 66, 67; 16/389, 365, 16/366, 370, 352; 439/719; 220/6, 7, 4.28, 220/666, 668; 52/79.5, 71, 64; 296/169, 296/173; 135/128, 130, 143, 144, 147, 148, 135/149, 151, 155, 901, 902, 900
See application file for complete search history.

(56) References Cited

U.S. PATENT DOCUMENTS

| 578,445 A | * | 3/1897 | Cobleigh | 217/14 |
|---|---|---|---|---|
| 1,824,822 A | * | 9/1931 | Kradolfer | 248/646 |
| 1,893,526 A | * | 1/1933 | Shriver | 312/266 |
| 2,439,494 A | * | 4/1948 | Stone | 16/288 |
| 2,552,170 A | * | 5/1951 | Gusmorino | 190/30 |
| 2,583,931 A | * | 1/1952 | Cummings | 312/262 |
| 2,605,617 A | * | 8/1952 | Replogle | 62/326 |
| 4,099,809 A | * | 7/1978 | Leotta | 312/140.2 |
| 5,133,378 A | * | 7/1992 | Tanasychuk | 135/148 |
| 5,212,628 A | * | 5/1993 | Bradbury | 361/679.44 |
| 5,444,944 A | * | 8/1995 | Roelofsz | 52/64 |
| 5,590,022 A | * | 12/1996 | Harvey | 361/679.41 |
| 5,622,198 A | * | 4/1997 | Elsinger | 135/128 |
| 5,775,034 A | * | 7/1998 | Logue | 52/36.1 |
| 6,039,418 A | * | 3/2000 | Thomas | 312/258 |

(Continued)

FOREIGN PATENT DOCUMENTS

CN    2674514 Y    12/2003

(Continued)

*Primary Examiner*—Darnell M Jayne
*Assistant Examiner*—Michael Calabrese (57) ABSTRACT

A dually foldable host unit case for a computer includes a first plate member, an upper cover member, a lower cover, a front wall and a rear wall. The first plate member pivotally connects with the upper cover, the lower cover, the front wall and the rear wall respectively. The preceding parts are capable of being folded to allow the host unit case being reduced volume thereof while packaging and capable of being extended to allow the second lateral sides of the front and rear walls and the second lateral sides of the upper and lower covers are pivotally connected for setting up the host unit case conveniently and quickly.

6 Claims, 14 Drawing Sheets

U.S. PATENT DOCUMENTS

| | | | |
|---|---|---|---|
| 6,097,591 A * | 8/2000 | Ircha | 361/679.6 |
| 6,304,438 B1 * | 10/2001 | Liu et al. | 361/727 |
| 6,354,681 B1 * | 3/2002 | Nemec | 312/223.2 |
| 6,382,744 B1 * | 5/2002 | Xiao | 312/223.2 |
| 6,473,295 B2 * | 10/2002 | Chen | 361/679.02 |
| 6,542,356 B2 * | 4/2003 | Gan | 361/679.58 |
| 6,714,409 B2 * | 3/2004 | Chen | 361/679.33 |
| 6,761,421 B2 * | 7/2004 | Chen et al. | 312/223.2 |
| 6,826,039 B2 * | 11/2004 | Chen | 361/679.3 |
| 6,968,653 B2 * | 11/2005 | Stapleton et al. | 52/79.1 |
| 7,096,539 B2 * | 8/2006 | Muir | 16/366 |
| 7,151,672 B2 * | 12/2006 | Campbell | 361/725 |
| 7,181,805 B2 * | 2/2007 | Tremblay et al. | 16/366 |
| 7,248,464 B1 * | 7/2007 | Chiang | 361/679.55 |
| 2004/0201333 A1 * | 10/2004 | Chen | 312/223.2 |
| 2004/0257762 A1 * | 12/2004 | Shih | 361/687 |
| 2005/0063147 A1 * | 3/2005 | Yu | 361/683 |
| 2006/0279184 A1 * | 12/2006 | Chen et al. | 312/223.2 |

FOREIGN PATENT DOCUMENTS

| | | |
|---|---|---|
| JP | 10107451 | 4/1998 |
| TW | 479927 | 3/2002 |
| TW | 539388 | 6/2003 |
| TW | 558024 | 10/2003 |
| TW | 570486 | 1/2004 |

* cited by examiner

DUALLY FOLDABLE HOST UNIT CASE FOR A COMPUTER

BACKGROUND OF THE INVENTION

1. Field of the Invention

The present invention is related to a host unit case of a personal computer and particularly to a built-up type host unit case of a computer.

2. Brief Description of Related Art

The host unit case is employed to receive electronic devices such as a main board, hard disks, optical disk drives, floppy disk drives and power supply device. Usually, the host unit case is set up with an unchangeable structure. The composite type host unit case has prior art such as U.S. Pat. No. 6,961,236 and Taiwan Utility model publication No. M258544. U.S. Pat. No. 6,961,236 discloses a computer chassis and Taiwan Utility model publication No. M258544 discloses a host unit case to meet specifications of ATX and BTX.

Following prior art which is belonged to a further type for the host unit case is made available for being disassembled into several parts before being set up as the host unit case. Taiwan Patent Publication No. 468811 discloses a host unit case for an industrial computer. Taiwan Patent Publication No. 490120 discloses a composite computer chassis. Taiwan Patent Publication No. 474423 discloses a computer chassis free from aid of hand tools. Taiwan Patent Publication No. 490120 discloses a composite type computer chassis. Taiwan Patent Publication No. 531142 discloses a composite type computer chassis assembly.

Further, the computer chassis free from aid of hand tools disclosed in Taiwan Patent Publication No. 474423 provides the front and rear cover plates, which are pivotally joined to a bottom plate with head pins, two frame plates for a big floppy disk drive, which are pivotally joined to the front and rear cover plates, and a cover plate for a small floppy disk drive is assembled to a frame plate and is fixedly hung to the bottom of frame plate for the big floppy disk drive. Further, four L shaped plates are fixed at four corners of the bottom plate to be joined to the two cover plates firmly. Finally, two lateral cover plates are hooked to the lateral sides of the preceding structure and fastened with set screws after the main board and the power supply frame being mounted to the preceding structure to complete the whole assembly of the computer chassis. The parts of the computer chassis are packaged separately such that less space is required for storage.

However, parts of the preceding prior art are so many and divided into several part groups and it is inconvenient to pick right parts during setting up the computer chassis such that it is hard to gather the parts before assembling and it takes a lot of time set up the computer chassis.

SUMMARY OF THE INVENTION

The primary object is to provide a dually foldable host unit case for a computer with which the host unit case can be completely set up easily and quickly to enhance fun while the host unit case being set up by the user.

Another object is to provide a dually foldable host unit case for a computer with which the parts can be gathered together and reduced in a small volume while packaging for lowering delivery cost and saving storage space.

Accordingly, a dually foldable host unit case for a computer according to the present invention is capable of being reduced volume thereof while packaging and being completely set up conveniently and quickly and comprises:

a first plate member;

an upper cover, having the first lateral side thereof to pivotally connect with the upper end of the first plate member;

a lower cover, having the first lateral side thereof to pivotally connect with the lower end of the first plate member;

a front wall, having the first lateral side thereof to pivotally connect with the front end of the first plate member; and a rear wall, having the first lateral side thereof to pivotally connect with the rear end of the first plate member;

wherein, the preceding parts are capable of being extended to allow the second lateral sides of the front and rear walls fixedly connecting with the second lateral sides of the upper and lower covers for the host unit case being completely set up conveniently and quickly for the host unit case being reduced the volume thereof while packaging.

BRIEF DESCRIPTION OF THE DRAWINGS

The present invention can be more fully understood by reference to the following description and accompanying drawings, in which.

DETAILED DESCRIPTION OF THE INVENTION

Figure 1:
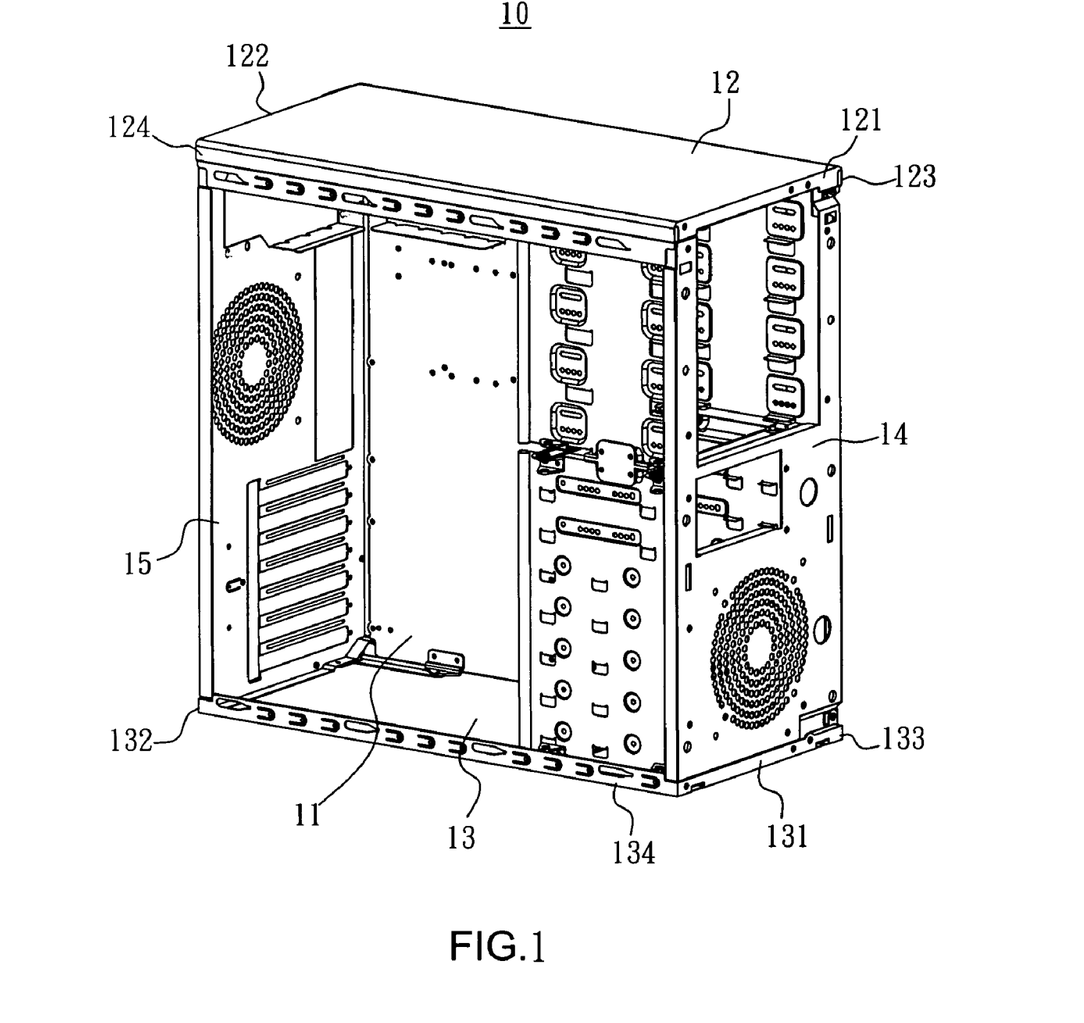
FIG. 1 is a perspective view of the first embodiment of a dually foldable host unit case for a computer according to the present invention.
Figure 2A:
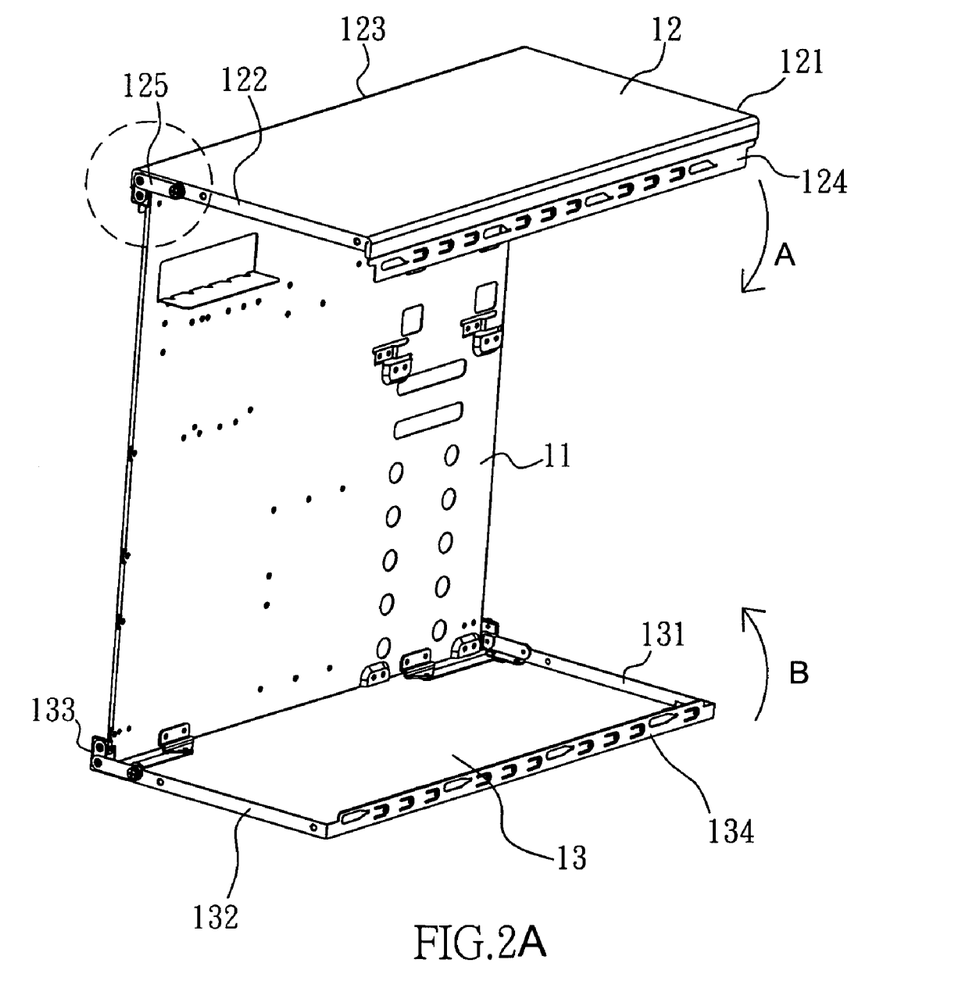
FIG. 2A is a perspective view illustrating the first plate in association with the upper cover and the lower cover in the first embodiment of the present invention.
Figure 2B:
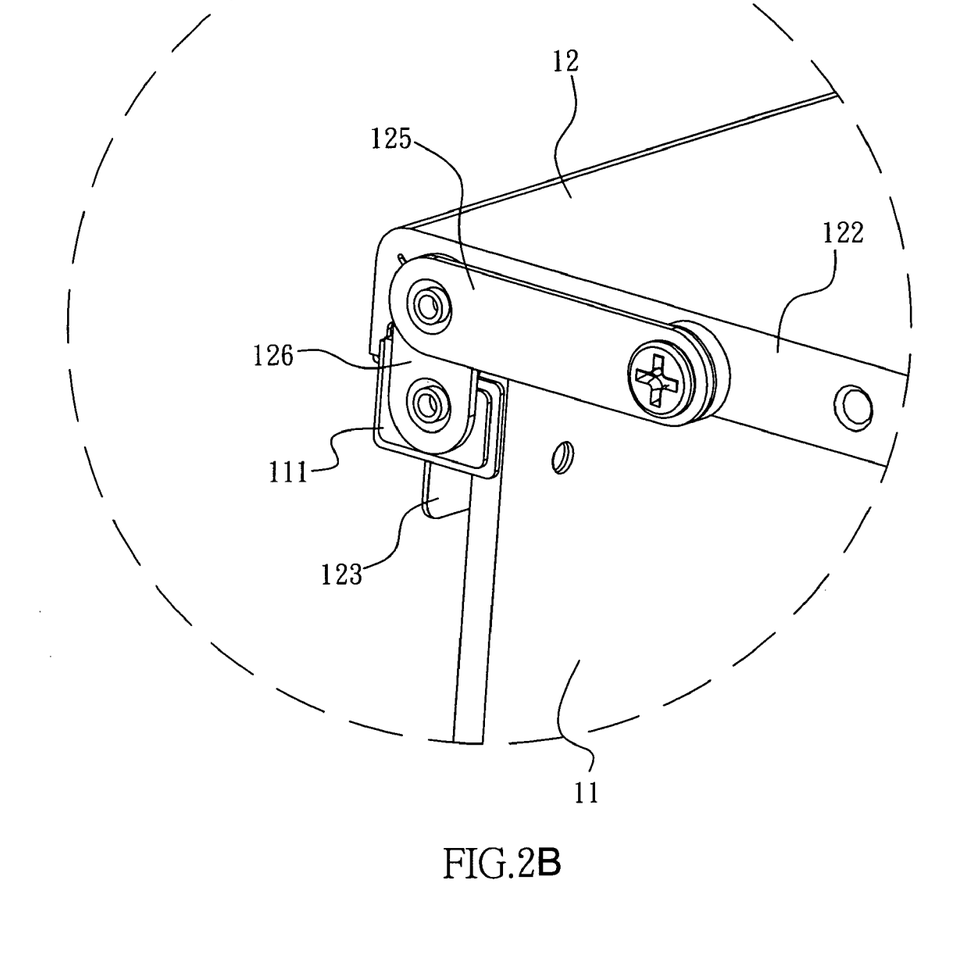
FIG. 2B is an enlarged perspective view of the portion in the dashed circle in FIG. 2A.

Referring to FIGS. 1, 2A and 2B, the first embodiment of a dually foldable host unit case according to the present invention is capable of being reduced volume thereof for packaging and being completely set up conveniently and quickly. The host unit case 10 includes a first plate member 11, an upper cover 12 and a lower cover 13. The first plate member 11 is mounted with a main board. The upper cover 12 extends downward a front margin frame 121, a rear margin frame 122, a left margin frame 123 and a right margin frame 124 at the four sides thereof. The front and rear margin frames 121, 122 pivotally connect with an end of a first connecting rod 125 respectively. Another end of the connecting rod 125 pivotally connects with an end of the second connecting rod 126. Another end of the second connecting rod 126 pivotally connects with two first lugs 111, which corresponds to each other. The two first lugs 111 are joined to the tops of the front and rear ends of the first plate member 11 respectively such that the left side end of the upper cover 12 pivotally connects with the upper end of the first plate member 11 and the upper end of the first plate member 11 is disposed at the inner side of the left margin frame 123 of the upper cover 12. The lower cover 13 extends upward a front margin frame 131, a rear margin frame 132, a left margin frame 133 and a right margin frame 134 at the four sides thereof. The left side end of the lower cover 13 pivotally connects with the lower end of the first plate member 11 and the lower end of the first plate member 11 is disposed at the inner side of the left margin frame 133 of the lower cover 13. The pivotal connecting structure between the lower cover 13 and first plate member 11 is the same as that between the upper cover 12 and the first plate member 11. No further detail will be described. The right margin frame 124 of the upper cover 12 and right margin frame 134 of the lower cover 13 are moved along arrows A and B of FIG. 2A to be close to the first plate member 11.

Figure 3A:
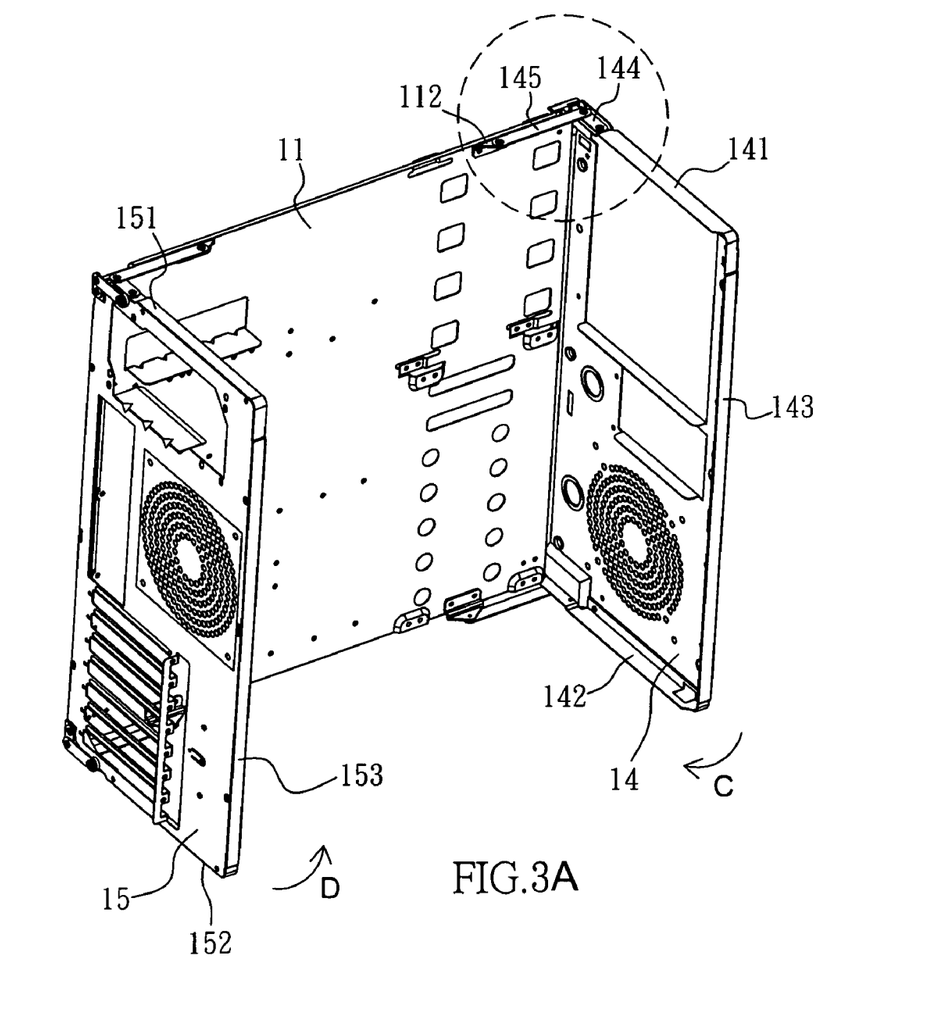
FIG. 3A is a perspective view illustrating the first plate in association with the front wall and the rear wall in the first embodiment of the present invention.
Figure 3B:
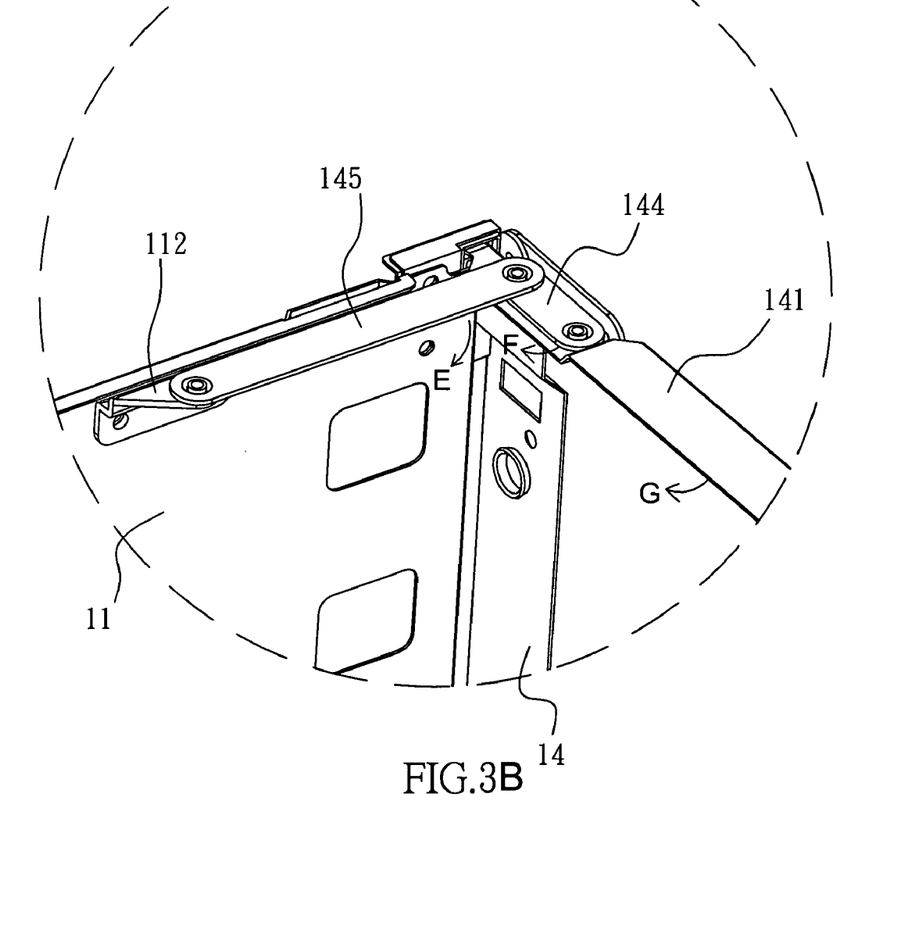
FIG. 3B is an enlarged perspective view of the portion in the dashed circle in FIG. 3A.
Figure 4A:
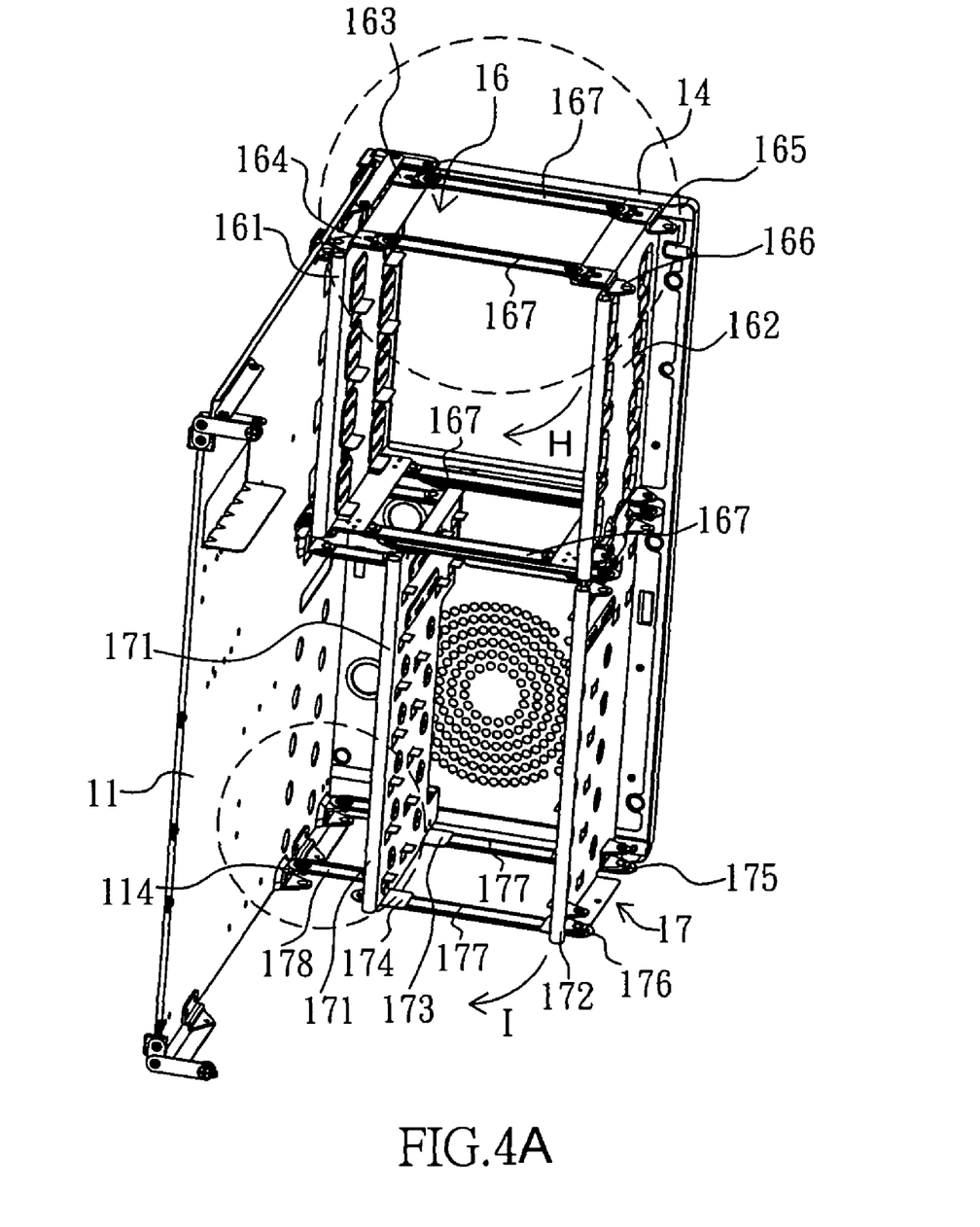
FIG. 4A is a perspective view illustrating the first plate in association with first support member and the second support member in the first embodiment of the present invention.

Referring to FIGS. 1, 3A and 3B, a front wall 14 extends rearward an upper margin frame 141, a lower margin frame 142 and a right margin frame 143. The upper and lower margin frames 141, 142 of the front wall 14 pivotally connect with an end of a third connecting rod 144 respectively. Another end of the third connecting rod 144 pivotally connects with a fourth connecting rod 145. Another end of the respective fourth connecting rod 145 pivotally connects with a second lug 112. The two lugs 112 are joined to the upper and lower ends of the front side of the first plate member 11 such that the left lateral end of the front wall 14 is capable of pivotally connecting the front side of the first plate member 11 and the upper and lower ends of the front wall 14 are disposed at the inner sides of the front margin frame 121 of the upper cover 12 and the front margin frame 131 of the lower cover 13. The pivotal end between the fourth connecting rod 145 and the third connecting rod 144 can move relative to the second lugs 112 along direction indicated by an arrow E shown in FIG. 3B. The pivotal end between the third connecting rod 144 and the upper margin frame 144 can move relative to the fourth connecting rod 145 along direction indicated by an arrow F shown in FIG. 3B. The upper margin frame 141 can move relative to the third connecting rod 144 along direction indicated by arrow G shown in FIG. 3B. In this way, the front wall 14 is away the first plate 11 a bigger gap for receiving the first and second support members 16, 17 while the front wall 14 is folded to the lateral side of the first plate 11 as shown in FIG. 4A. A rear wall 15 extends forward an upper margin frame 151, a lower margin frame 152 and a right margin frame 153. The left side end of the rear wall 15 pivotally connects with the rear end of the first plate member 11 and the upper and lower ends of the rear wall 15 are disposed at the inner sides of the rear margin frame 122 of the upper cover 12 and the rear margin frame 132 of the lower cover 13. The pivotal structure of the rear wall 15 and the first plate member 11 is the same as that of the front wall 14 and the first plate member 11. No further detail will be described. The left margin frame 143 of the front wall 14 and right margin frame 153 of the rear wall 15 can move along direction indicated by allows C and D shown in FIG. 3A to press the first plate member 11.

Figure 4B:
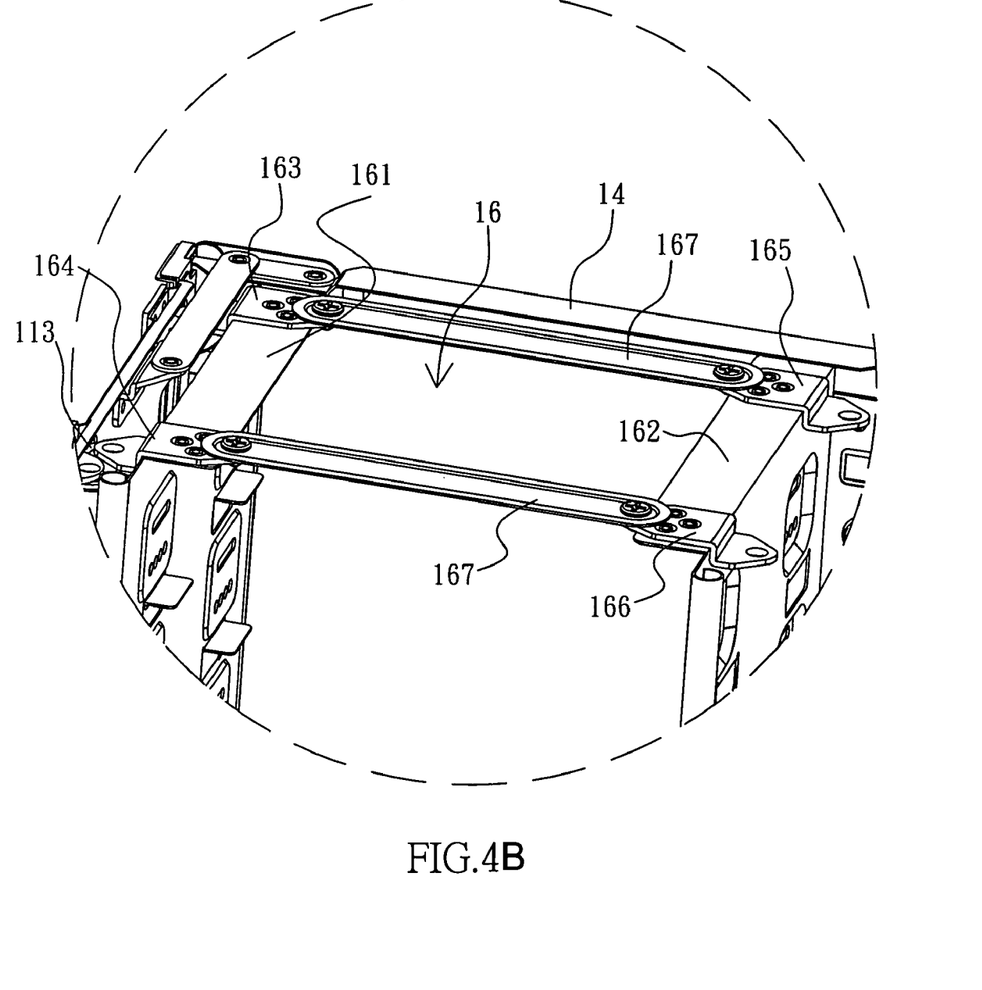
FIG. 4B is an enlarged perspective view illustrating the portion in one of the dashed circles of FIG. 4A.
Figure 4C:
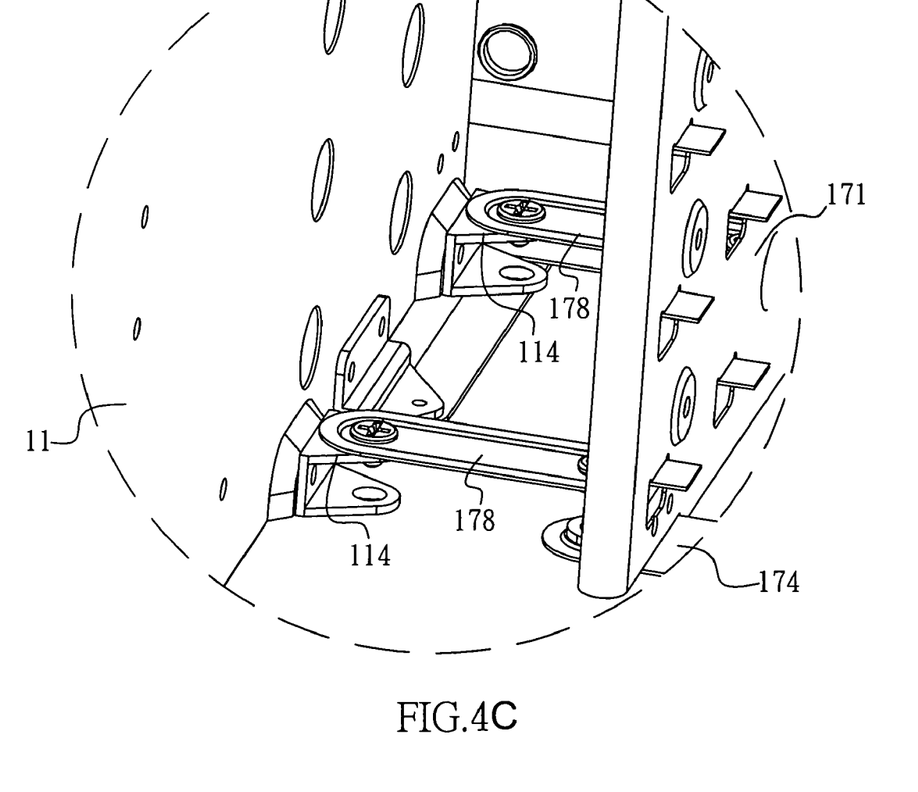
FIG. 4C is an enlarged perspective view illustrating the portion in another dashed circle of FIG. 4A.

Referring to FIGS. 4A, 4B and 4C, a foldable first support member 16 has a left partition 161 and a right partition 162. The left partition 161 pivotally connects with a pivotal plate element 163, 164 at both ends thereof and the right partition 162 pivotally connects with a pivotal plate element 165, 166 at both ends thereof. A connecting rod 167 is disposed between the pivotal plate elements 163 and 165 with both ends of the connecting rod being pivotally connected to the pivotal plate elements 163 and 165 respectively. Another connecting rod 167 is disposed between the pivotal plate elements 164 and 166 with both ends of the connecting rod being pivotally connected to the pivotal plate elements 164 and 166 respectively. The pivotal plate elements 163, 164 each pivotally connect with a third lug 113 at the other ends thereof respectively and the third lug 113 is joined to the first plate member 11. A foldable second support member 17 has a left partition 171 and a right partition 172. The left partition 171 pivotally connects with a pivotal plate element 173, 174 at both ends thereof and the right partition 172 pivotally connects with a pivotal plate element 175, 176 at both ends thereof. A connecting rod 177 is disposed between the pivotal plate elements 173 and 175 with both ends of the connecting rod being pivotally connected to the pivotal plate elements 173 and 175 respectively. Another connecting rod 177 is disposed between the pivotal plate elements 174 and 176 with both ends of the connecting rod being pivotally connected to the pivotal plate elements 174 and 176 respectively. A connecting rod 178 is disposed between the pivotal plate elements 173 and a fourth lug 114 with both ends of the connecting rod being pivotally connected to the pivotal plate elements 173 and the fourth lug 114 respectively. Another connecting rod 178 is disposed between the pivotal plate elements 174 and another fourth lug 114 with both ends of the connecting rod being pivotally connected to the pivotal plate elements 174 and the another fourth lug 114 respectively. The fourth lugs 114 are joined to the first plate member 11. The left and right partitions 161, 171 of the first and second support members 16, 17 pivotally connect with the first plate member 11. The left partitions 161, 171 and the right partitions 162, 172 are pivotally connected to each other with four connecting rods such that the right partitions 162, 172 are capable of moving along arrows H, I shown in FIG. 4A to contact the left partitions 161, 171 against the first plate member 11. The first support member 16 and the second support member 17 are disposed at the inner side of front wall 14 in a way of the second support member 17 being under the first support member 16. The first and second support members 16, 17 are attached with a 5.25" and 3.25" floppy disk drives. The first and second support members 16, 17 are pivotally connected to the first plate member 11 with a structure applying principle of four-connecting-rod linkage such that it is available for the first and second support members 16, 17 being folded to press the first plate member 11. The four connecting rods 167, 177 can be arranged in either the same length or different lengths.

Figure 5A:
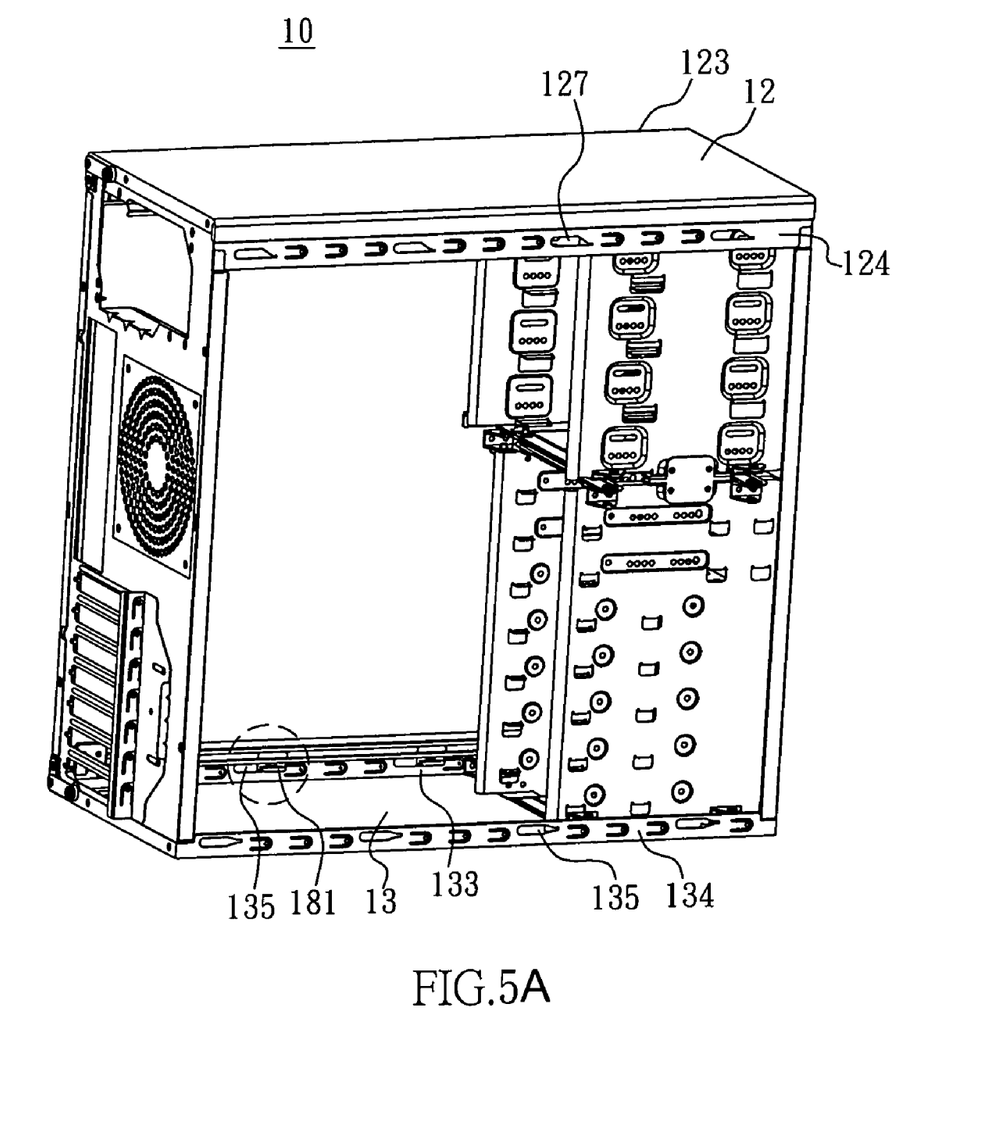
FIG. 5A is a perspective view illustrating the upper cover and the lower cover in association with the lateral plate in the first embodiment of the present invention.
Figure 5B:
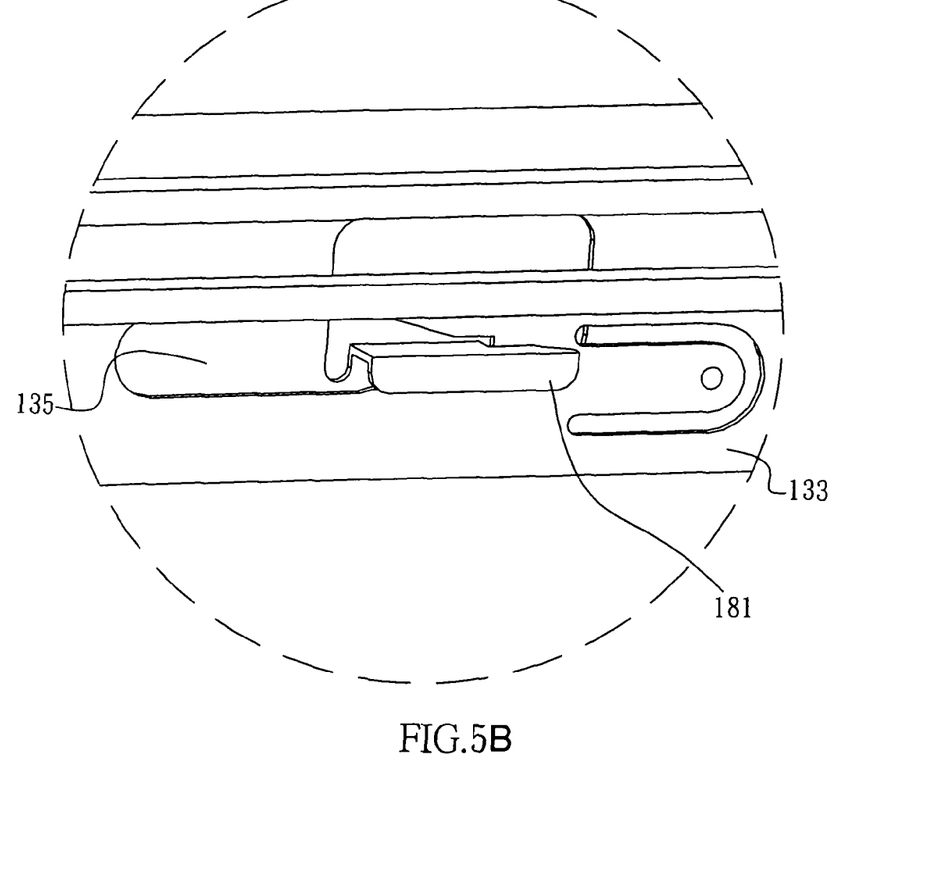
FIG. 5B is an enlarged perspective view illustrating the portion in one of the dashed circles of FIG. 5A.
Figure 5C:
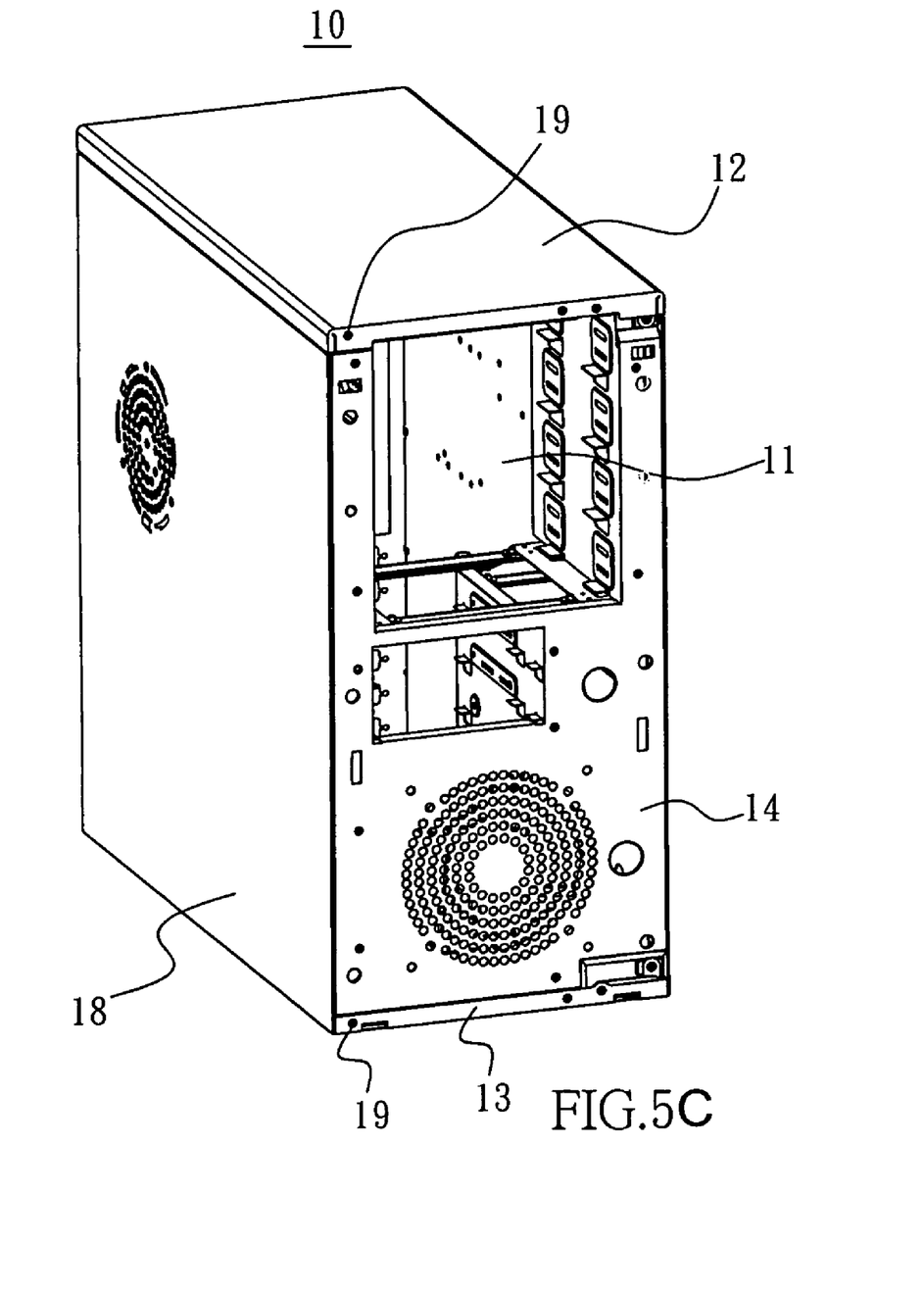
FIG. 5C is a perspective view illustrating the upper cover and the lower cover in association with the lateral plate in the first embodiment of the present invention.
Figure 6:
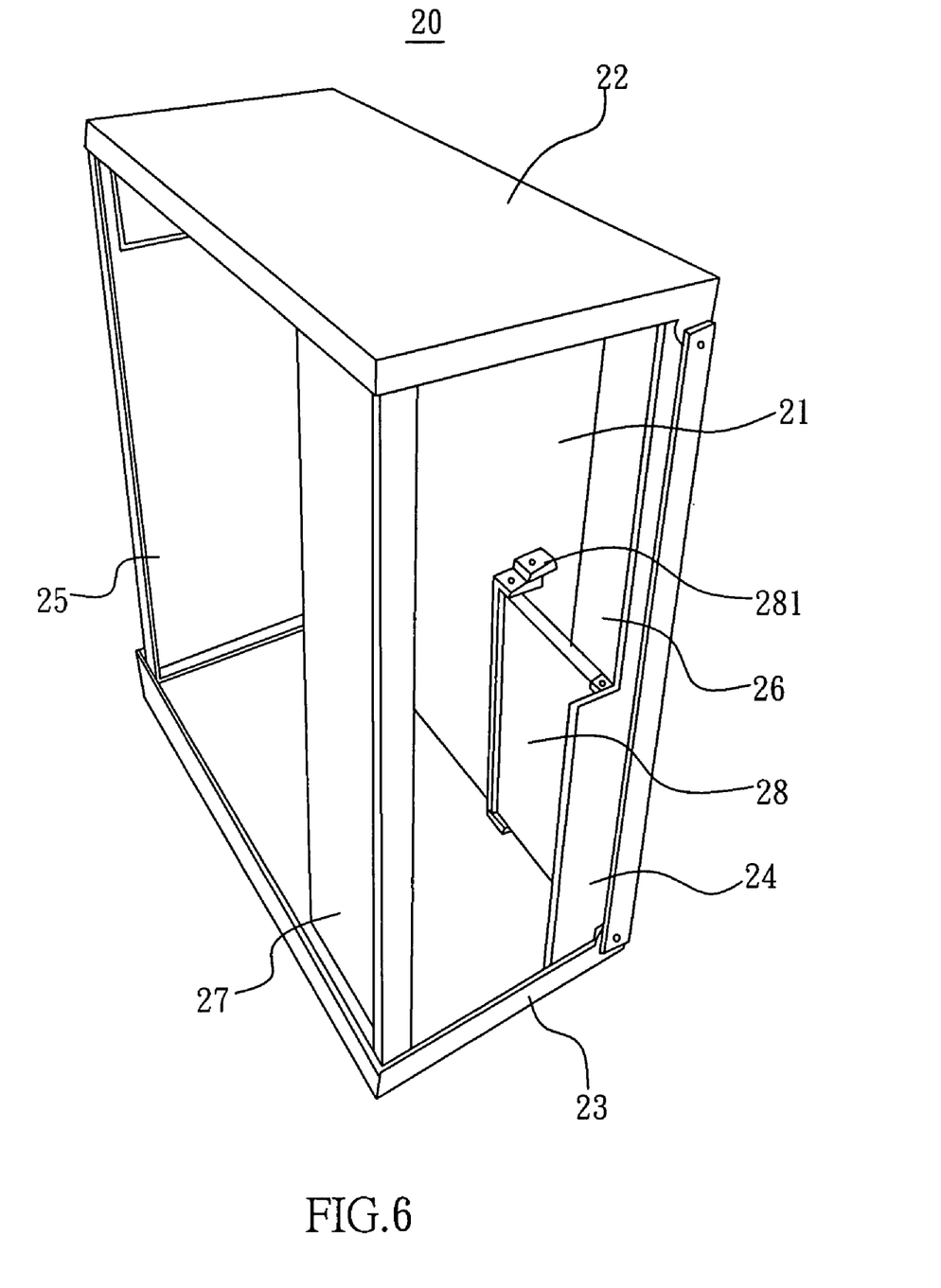
FIG. 6 is a perspective view of the second embodiment of the dually foldable host unit case according to the present invention.

Referring to FIGS. 1, 5A, 5B and 5C, the left and right margin frames 123, 124 of the upper cover 12 and the left and right margin frames 133, 134 of the lower cover 13 have engaging holes 127, 135 respectively. Two lateral plates 18 have lock ears 181 corresponding to the lock holes 127, 135 such that the lateral plates 18 are joined to the left and right lateral sides of the upper and lower covers 12, 13 as shown in FIG. 5C with the lock ears 181 engaging with the lock holes 127, 135. The front and rear ends of the upper and lower covers 12, 13 provide fixing holes 19 corresponding to fixing holes 19 at the front and rear walls 14, 15 respectively such that the front and rear ends of the upper and lower covers 12, 13 are secured to the front and rear walls 14, 15 firmly with screws passing through the fixing holes 19.

The first plate member 11 of the host unit case 10 is pivotally connected to the first lateral sides of the first and second support members 16, 17, the front wall 14, the rear wall 15, the upper cover 12 and the lower cover 13 such as the left sides thereof respectively to allow the preceding parts connect with each other before being set up as a complete host unit case such that a reduced size package is formed conveniently. By the same token, the second lateral sides, for instance, the right lateral sides of the preceding folded parts such as the first and second support members 16, 17, the front wall 14, the rear wall 15, the upper cover 12 and the lower cover 13 can be unfolded quickly. In this way, the second lateral sides of the first and second support members 16, 17, the front wall 14 and the rear wall 15 are joined to the second lateral sides of the upper and lower covers 12, 13 to form a completely set up host unit case 10.

Figure 8:
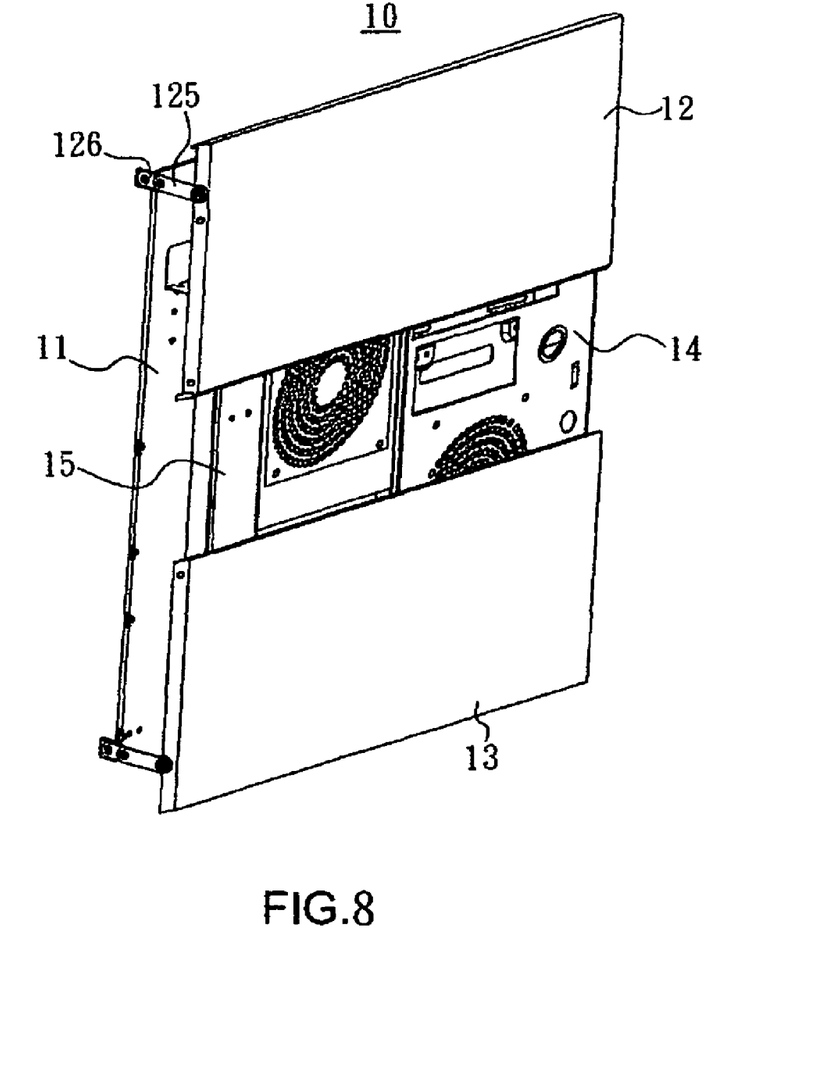
FIG. 8 is a perspective view illustrating the foldable case shown in FIG. 1 in A state after being folded.

Referring to FIG. 8, the host unit case 10 in a state of being folded is illustrated. It can be seen in FIG. 8 that the first plate member 11 pivotally connects with the upper cover 12 and the lower cover 13 with connecting-rods 125, 126 for the upper cover 12 and the lower cover 13 being folded. The front wall 14 and the rear wall 15 are folded between the first plate member 11 and the two covers 12, 13.

Figure 7A:
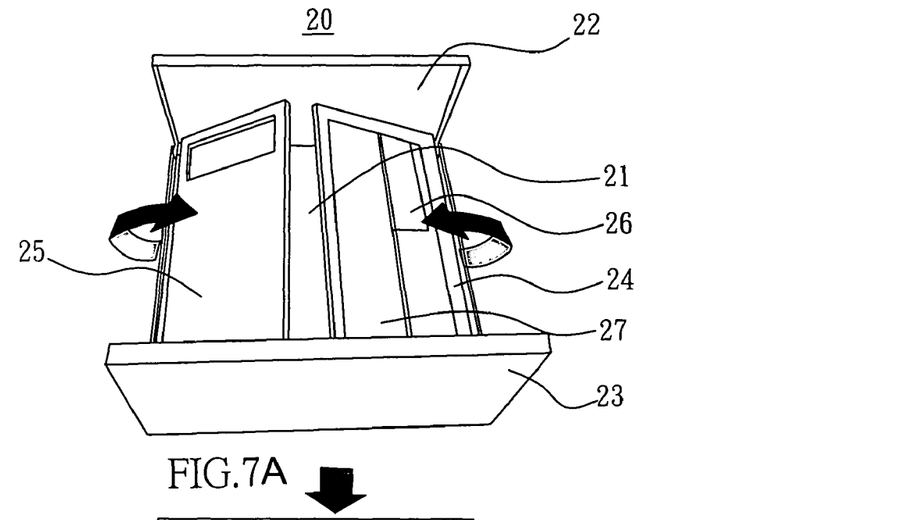
FIGS. 7A, 7B and 7C are perspective views illustrating steps to fold the second embodiment of the dually foldable host unit case according to the present invention.
Figure 7B:
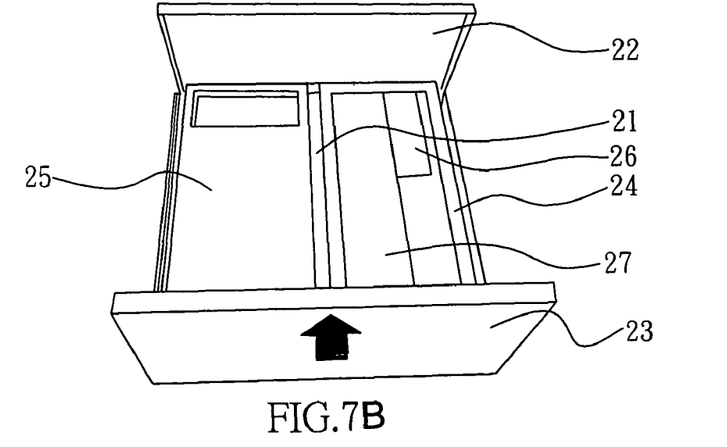
Figure 7C:
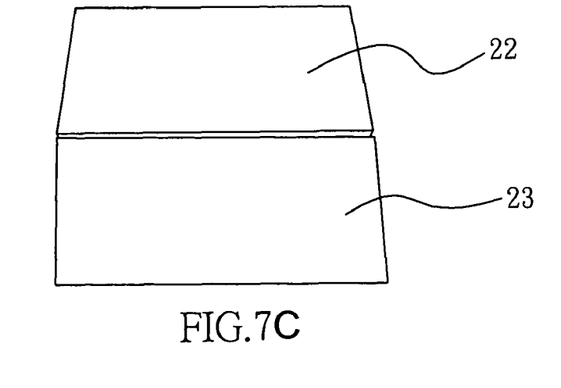

Referring to FIGS. 6, 7A, 7B and 7C, the second embodiment of the host unit case 20 is illustrated. The structure of the second embodiment is almost the same as the first embodiment of the present invention, that is, the first plate member 21 is pivotally joined to the front wall 24, the rear wall 25, the upper cover 22 and the lower cover 23. The differences of the present embodiment from the previous first embodiment are in that the first and second lateral sides of the front wall 24 are pivotally connected to a first support member 26 and a second support member 27 respectively; four corners of a third support member 28 are pivotally joined to the first plate member 21 via a connecting rod 281 respectively. A space between the first and second support members 26, 27 for being attached with a 5.25" floppy disk and a space between the second and third support members 27, 28 is available for accommodating a 3.25" floppy disk. In case of folding the host unit case, the first and second support members 26, 27 are arranged to contact the front wall 24 closely and the third support member 28 is arranged to contact the first plate 21 closely first. Next, the front wall 24 and the rear wall 25 are folded to contact the first plate member 21. Then, the upper and lower covers 22, 23 are folded to contact the tops of the front and rear walls 24, 25 to obtain a volume greatly reduced package as shown in FIGS. 7A, 7B and 7C.

Referring to FIGS. 7A, 7B and 7C again, the host unit case 20 of the present embodiment allows the original front wall 24, the rear wall 25, the upper cover 22 and the lower cover 23 thereof to become the upper cover, the lower cover, the front wall and the rear wall respectively. The front ends of the upper and lower covers are disposed at rear side of the front wall and the rear ends of the upper and lower covers are disposed at the front side of rear wall. In case of setting up the host unit case, the front and rear ends of the second lateral sides of the upper and lower covers are joined to a position between the second lateral sides of the front and rear walls. In case of folding the host unit case, the upper and lower covers are folded to contact the first plate member closely first and then the front and rear walls are folded to contact the tops of the upper and lower covers closely to form a package with greatly reduced volume.

It is appreciated that the dually foldable host unit case for a computer according to the present invention is capable of being set up a complete host unit case easily and quickly to enhance fun with self setting up the host unit case and be favorable for decreasing delivery cost and saving available storage space.

While the invention has been described with referencing to preferred embodiments thereof, it is to be understood that modifications or variations may be easily made without departing from the spirit of this invention, which is defined by the appended claims.

What is claimed is:

1. A foldable host unit case for a computer, which is capable of being collapsed, comprising:
a first plate member with upper, lower, front and rear ends, the first plate member pivotally connecting with a first foldable support member and a second foldable support member, and the second foldable support member is disposed below said first foldable support member;
an upper cover having first and second lateral sides, the first lateral side pivotally connecting with the upper end of the first plate member;
a lower cover having third and fourth lateral sides, the third lateral side pivotally connecting with the lower end of the first plate member;
a front wall having fifth and sixth lateral sides, the fifth lateral side pivotally connecting with the front end of the first plate member; and
a rear wall having seventh and eighth lateral sides, the seventh lateral side pivotally connecting with the rear end of the first plate member;
whereby the foldable host unit case is capable of being extended to a set up position wherein the sixth and eighth lateral sides fixedly connect with the second and fourth lateral sides;
wherein the first support member has a first left partition and a first right partition with each of the upper and lower ends of each of the partitions being joined to two first pivotal plate elements respectively; a side of the respective first pivotal plate elements at the first left partition aligns with a respective side of the respective first pivotal plate elements at the first right partition with the upper and lower ends of each of the sides pivotally connecting two ends of a first-connecting rod; and the respective first pivotal plate elements at the first left partition further pivotally connects with a first-lug and each first-lug is joined to the first plate member.

2. The foldable host unit case for a computer as defined in claim 1, wherein the second support member has a second left partition and a second right partition with each of the upper and lower ends of each of the second left and second right partitions being joined to two second pivotal plate elements respectively; a side of the respective second pivotal plate elements at the second left partition aligns with a side of the respective second pivotal plate elements at the second right partition with the upper and lower ends of each of the sides pivotally connecting two ends of a second-connecting rod; and the respective second pivotal plate elements at the second left partition further pivotally connects with a second-lug and said second-lug is joined to the first plate member.

3. The foldable host unit case for a computer as defined in claim 2, wherein the upper cover has first front and first rear margin frames extending downward; the front and rear margin frames pivotally connecting with ends of first and second third-connecting rods respectively; another end of each of the first and second third-connecting rods pivotally connecting with ends of first and second fourth-connecting rods respectively; another end of each of the first and second fourth-connecting rods pivotally connecting with a first and second third-lugs respectively; and the first and second third-lugs are respectfully joined to the tops of the front and rear ends of the first plate member, pivotally connecting the first lateral side with the upper end of the first plate member.

4. The foldable host unit case with foldable lateral walls for a computer as defined in claim 3, wherein the lower cover has second front and second rear margin frames extending upward; the second front and second rear margin frames pivotally connecting with ends of third and fourth third-connecting rods respectively; another end of each of the third and fourth third-connecting rods pivotally connecting with third and fourth third-lugs respectively; and said third and fourth third-lugs are respectfully joined to the lower ends of the front and rear ends of the first plate member pivotally connecting the third lateral side at the lower cover with the lower end of the first plate member.

5. The foldable host unit case for a computer as defined in claim 4, wherein the front wall has first upper and first lower margin frames extending rearward; the first upper and first lower margin frames pivotally connecting with ends of first and second fifth-connecting rods respectively; another end of each of the first and second fifth-connecting rods pivotally connecting with ends of first and second sixth-connecting rods; another end of each of the first and second sixth-connecting rods pivotally connecting with first and second fourth lugs; and said first and second fourth lugs are respectfully joined to the upper and lower ends of the front end of the first plate member such that the fifth lateral side at the front wall pivotally connects with the front end of the first plate member.

6. The foldable host unit case for a computer as defined in claim 5, wherein the rear wall has second upper and second lower margin frames extending forward; the second upper and second lower margin frames pivotally connecting with ends of third and fourth fifth-connecting rods respectively; another end of each of said third and fourth fifth-connecting rods pivotally connecting with ends of third and fourth sixth-connecting rods respectively; another end of each of said third and fourth sixth-connecting rods pivotally connecting with third and fourth fourth-lugs respectively; said third and fourth fourth-lugs are respectfully joined to the upper and lower ends of the rear end of the first plate member such that the seventh lateral side at the rear wall pivotally connects with the rear end of the first plate member.

* * * * *